United States Patent
Reuber et al.

(10) Patent No.: US 11,697,229 B2
(45) Date of Patent: Jul. 11, 2023

(54) CRACK GAP MOLD FOR PRODUCING A PARTICLE FOAM PART TOGETHER WITH AN APPARATUS FOR PRODUCING A PARTICLE FOAM PART

(71) Applicant: Kurtz GmbH, Kreuzwertheim (DE)

(72) Inventors: Norbert Reuber, Bergrothenfels (DE); Constantin Kemmer, Marktheidenfeld (DE); Victor Romanov, Wertheim (DE)

(73) Assignee: Kurtz GmbH, Kreuzwertheim (DE)

( * ) Notice: Subject to any disclaimer, the term of this patent is extended or adjusted under 35 U.S.C. 154(b) by 1071 days.

(21) Appl. No.: 16/464,156

(22) PCT Filed: Dec. 1, 2017

(86) PCT No.: PCT/EP2017/081210
§ 371 (c)(1),
(2) Date: May 24, 2019

(87) PCT Pub. No.: WO2018/100169
PCT Pub. Date: Jun. 7, 2018

(65) Prior Publication Data
US 2020/0316829 A1    Oct. 8, 2020

(30) Foreign Application Priority Data

Dec. 1, 2016    (DE) .................. 10 2016 123 214.9
Nov. 24, 2017   (DE) .................. 20 2017 107 149.9

(51) Int. Cl.
*B29C 44/58*    (2006.01)
*B29C 33/20*    (2006.01)
(Continued)

(52) U.S. Cl.
CPC .......... *B29C 44/585* (2013.01); *B29C 33/202* (2013.01); *B29C 33/26* (2013.01);
(Continued)

(58) Field of Classification Search
CPC ..... B29C 33/308; B29C 44/508; B29C 44/58; B29C 59/00; B29C 33/202
See application file for complete search history.

(56) References Cited

U.S. PATENT DOCUMENTS 3,060,513 A    10/1962   Klink et al.
3,242,238 A    3/1966    Edberg et al.
(Continued)

FOREIGN PATENT DOCUMENTS

CH    472959      5/1969
CN    1621212 A   6/2005
(Continued)

OTHER PUBLICATIONS

International Preliminary Report on Patentability, dated Jun. 13, 2019, from International Application No. PCT/EP2017/081183, filed on Dec. 1, 2017. 33 pages.
(Continued)

*Primary Examiner* — Alison L Hindenlang
*Assistant Examiner* — Debjani Roy
(74) *Attorney, Agent, or Firm* — HoustonHogle LLP

(57) ABSTRACT

The invention relates to a crack-split moulding tool for producing a foam particle part, having two mould halves (2, 3). The mould halves (2, 3) are pivotably mounted relative to one another such that they can be arranged at a varying distance from each other in certain sections when being filled with foam particles and when pressing together, are moved together at a varying distance until in a closed position, due to a pivoting movement. As a result, it is possible to homogeneously compress areas of the moulding cavity (6) having a different thickness and to compress in a different manner, area having the same thickness.

14 Claims, 11 Drawing Sheets

Figure 1A:
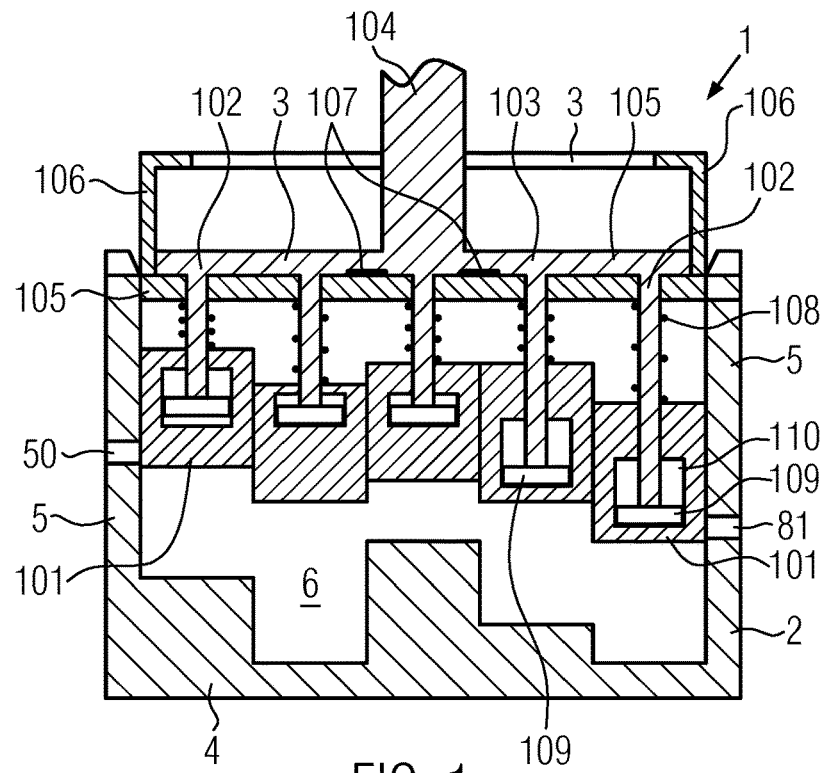

(51) Int. Cl.
*B29C 33/26* (2006.01)
*B29C 35/08* (2006.01)
*B29C 44/44* (2006.01)
*B29K 75/00* (2006.01)
*B29K 105/04* (2006.01)

(52) U.S. Cl.
CPC ........ *B29C 35/0805* (2013.01); *B29C 44/445* (2013.01); *B29C 44/58* (2013.01); *B29C 2035/0861* (2013.01); *B29K 2075/00* (2013.01); *B29K 2105/048* (2013.01); *B29K 2995/0046* (2013.01)

(56) References Cited

U.S. PATENT DOCUMENTS

| | | | | |
|---|---|---|---|---|
| 3,264,381 | A | * | 8/1966 | Stevens ............. B29C 44/445 264/45.2 |
| 3,331,899 | A | | 7/1967 | Immel |
| 3,843,304 | A | * | 10/1974 | Sigal ................ B30B 15/068 425/411 |
| 4,266,928 | A | | 5/1981 | Weidner et al. |
| 4,372,738 | A | * | 2/1983 | Black ................ B29C 45/641 249/166 |
| 4,574,289 | A | | 3/1986 | Henderson |
| 4,634,963 | A | | 1/1987 | Lunden |
| 4,851,167 | A | | 7/1989 | Marc |
| 5,082,436 | A | | 1/1992 | Choi et al. |
| 5,128,073 | A | | 7/1992 | Allen et al. |
| 5,248,459 | A | | 9/1993 | Fukasawa et al. |
| 5,332,384 | A | * | 7/1994 | Abramat ............. B29C 33/303 249/141 |
| 5,360,330 | A | | 11/1994 | Jensen et al. |
| 5,629,981 | A | | 5/1997 | Nerlikar |
| 5,973,308 | A | | 10/1999 | Sternowski |
| 6,220,842 | B1 | | 4/2001 | Kamiyama et al. |
| 6,275,196 | B1 | | 8/2001 | Bobier |
| 7,023,356 | B2 | | 4/2006 | Burkhardt et al. |
| 7,144,534 | B2 | | 12/2006 | Buchel et al. |
| 7,367,497 | B1 | | 5/2008 | Hill |
| 2001/0036814 | A1 | | 11/2001 | Bobier |
| 2002/0130432 | A1 | | 9/2002 | Lukas et al. |
| 2003/0101253 | A1 | | 5/2003 | Saito et al. |
| 2003/0224082 | A1 | | 12/2003 | Akopyan |
| 2005/0225444 | A1 | | 10/2005 | Clift et al. |
| 2006/0279014 | A1 | | 12/2006 | Balchin et al. |
| 2011/0187493 | A1 | | 8/2011 | Elfstrom et al. |
| 2012/0056345 | A1 | | 3/2012 | Lee |
| 2012/0154115 | A1 | | 6/2012 | Herrala |
| 2013/0099089 | A1 | | 4/2013 | Chang et al. |
| 2013/0176107 | A1 | | 7/2013 | Dumas et al. |
| 2014/0243442 | A1 | | 8/2014 | Coles et al. |
| 2015/0154844 | A1 | | 6/2015 | Skaaksrud |
| 2016/0055693 | A1 | | 2/2016 | Somani et al. |
| 2016/0063783 | A1 | | 3/2016 | Bruns et al. |
| 2016/0104334 | A1 | | 4/2016 | Handville et al. |
| 2016/0284147 | A1 | | 9/2016 | Trani |
| 2016/0311133 | A1 | | 10/2016 | Metaverso |
| 2017/0069149 | A1 | | 3/2017 | Scheja et al. |
| 2017/0104271 | A1 | | 4/2017 | Perottino |
| 2018/0308302 | A1 | | 10/2018 | Al-Yousef et al. |
| 2021/0107187 | A1 | * | 4/2021 | Romanov ............... B29C 43/36 |

FOREIGN PATENT DOCUMENTS

| | | |
|---|---|---|
| CN | 1791498 A | 6/2006 |
| CN | 103974813 | 8/2014 |
| DE | 735283 | 5/1943 |
| DE | 69021200 | 1/1996 |
| DE | 19921742 | 11/2000 |
| DE | 10117979 | 8/2002 |
| DE | 202004003679 | 5/2004 |
| DE | 202006009569 | 8/2006 |
| DE | 102013110242 | 8/2014 |
| DE | 102014117332 | 6/2016 |
| EP | 1259365 | 9/2001 |
| EP | 1631428 B1 | 1/2007 |
| EP | 1990170 A2 | 11/2008 |
| EP | 2556938 | 2/2013 |
| EP | 2845705 | 3/2015 |
| GB | 641 842 | 8/1950 |
| GB | 1403326 | 8/1975 |
| JP | S54144470 | 11/1979 |
| JP | H02283429 | 11/1990 |
| JP | H04261834 | 9/1992 |
| JP | H06320634 | 11/1994 |
| JP | H0740358 | 2/1995 |
| JP | 2000334763 | 12/2000 |
| TW | 201031512 A | 9/2010 |
| WO | WO0164414 | 9/2001 |
| WO | WO2013005081 | 1/2013 |
| WO | WO2013050581 | 4/2013 |
| WO | WO2014128214 | 8/2014 |
| WO | WO2015091906 | 6/2015 |

OTHER PUBLICATIONS

International Search Report, dated Aug. 6, 2018, from International Application No. PCT/EP2017/081183, filed on Dec. 1, 2017. 13 pages.
Office Action, dated Jun. 23, 2020, for Taiwanese Application No. 108116123, filed on Dec. 1, 2017. 14 pages.
Office Action, dated Jun. 30, 2020, for Taiwanese Application No. 106142067, filed on Dec. 1, 2017. 16 pages.
Office Action, dated Sep. 10, 2018, for Taiwanese Application No. 106142067, filed on Dec. 1, 2017. 26 pages.
Written Opinion, dated Aug. 6, 2018, from International Application No. PCT/EP2017/081183, filed on Dec. 1, 2017. 18 pages.
International Preliminary Report on Patenability, dated Jun. 4, 2019, from International Application No. PCT/EP2017/081210, filed on Dec. 1, 2017. 12 pages.
International Search Report, dated Jun. 13, 2018, from International Application No. PCT/EP2017/081210, filed on Dec. 1, 2017. 10 pages.
Written Opinion, dated Jun. 13, 2018, from International Application No. PCT/EP2017/081210, filed on Dec. 1, 2017. 14 pages.
German Search Report dated Mar. 15, 2017, from German Application No. 10 2016 123 214.9, filed on Dec. 1, 2016. 5 pages.
German Search Report dated Mar. 16, 2018, from German Application No. 20 2017 107 149.9, filed on Nov. 24, 2017. 3 pages.

* cited by examiner

CRACK GAP MOLD FOR PRODUCING A PARTICLE FOAM PART TOGETHER WITH AN APPARATUS FOR PRODUCING A PARTICLE FOAM PART

RELATED APPLICATIONS

This application is a § 371 National Phase Application of International Application No. PCT/EP2017/081210, filed on Dec. 1, 2017, now International Publication No. WO 2018/100169 A2, published on Jun. 7, 2018, which claims priority to German Application No, 10 2016 123 214.9, filed on Dec. 1, 2016 and German Application No. 20 2017 107 149.9, filed on Nov. 24, 2017, all of which are incorporated herein by reference in their entirety.

The present invention relates to a crack gap mold for producing a particle foam part together with an apparatus for producing a particle foam part.

WO 2014/128214 A1 discloses an apparatus and a method for producing a particle foam part. Here, foam particles are conveyed by means of a pipe from a material container to a mold, in which the foam particles are welded thermoplastically into a particle foam part under a supply of heat. In this case the heat is supplied by means of saturated dry steam.

In addition there are various tests and developments for supplying the heat by means of electromagnetic waves, in order to weld foam particles together. As examples, reference is made to WO 2013/05081 A1, U.S. Pat. Nos. 3,060,513, 3,242,238, GB 1,403,326, WO 01/64414 A1 and U.S. Pat. No. 5,128,073.

Also known, from WO 2014/128214 A1 is the use as mold of a so-called crack gap mold, which has a mold cavity of variable volume. In the case of such a crack gap mold, two mold halves which bound a mold cavity are arranged at a predetermined distance from one another. In this crack gap position, the mold is filled with foam particles. Then, the mold halves of the crack gap mold are pressed a little together, thereby compressing the foam particles in the mold. In this compressed state, the foam particles are welded together.

With a crack gap mold of this kind, particle foam parts of high density may be produced. In particular, the compression reduces the spandrel volume between the individual foam particles, and especially equalizes them, so that a homogenous particle foam part may be produced.

The invention is based on the problem of developing a crack gap mold in such a way that very homogenous particle foam parts with in particular uniform density may be produced. The invention is solved by a crack gap mold with the features of claim 1. Advantageous developments are set out in the dependent claims.

A crack gap mold for the production of a particle foam part according to the present invention comprises two mold halves which, for filling the mold with foam particles, may be arranged in a crack gap position, in which the mold halves are spaced somewhat apart from one another, as compared with a closed position. The mold halves are designed for pressing together the foam particles in the mold before welding. The crack gap mold is characterized by the fact that the mold halves are arranged so as to be movable and in particular pivotable relative to one another in such a way that, on filling with foam particles, certain areas may be spaced differently apart. As a result, during compression into the closed position, the mold halves may in certain areas be moved a different distance together, by means of a swiveling movement.

With this crack gap mold, areas of the particle foam part to be produced may be compressed with different strength before welding, by a swiveling movement. By this means it is possible that especially areas of a for example roughly wedge-shaped particle foam part which have different thickness are compressed with different strength during the transfer from the crack gap position into the closed position. In particular, the compression may be so set such that the distance covered by the part or the whole mold half in transferring from the crack gap position to the closed position is roughly proportional to the relevant thickness of the particle foam part. In this way, uniform compression of the particle foam part over its whole extent is obtained. This permits a homogenous design of the particle foam part, even if it has a wedge shape or a shape with areas of differing thickness.

Within the scope of the invention it is also possible to compress specific areas with different strength. It may for example be the case that a particle foam part is to be produced which is subject to very high stress in certain areas, requiring a greater packing of particle foam particles in these areas. Such a particle foam part may be obtained by compressing the areas in which foam particles of higher density are to be provided with greater strength than other areas, i.e. the movement path of the part of the mold half or of the whole mold half in this area is greater than in the other areas, in relation to the thickness of the particle foam part in this area.

One of the two mold halves may be mounted pivotably around a swivel axis so that, on compression from the crack gap position into the closed position, this mold half executes the swiveling movement. The swivel axis is preferably eccentric relative to the mold half. With a pivotable mold half of this kind, wedge-shaped particle foam parts may be produced easily with an even density of foam particles. The swivel axis is preferably parallel to a plane which stands perpendicular to the direction in which, in the transfer from the crack gap position into the closed position, at least one of the two mold halves is moved towards the other mold half.

With such a swiveling movement, on the one hand a roughly wedge-shaped particle foam part may be evenly compressed or in principle in one particle foam part, a roughly evenly changing compression of the foam particles may be set along one direction.

Preferably the mold has a swivel element, which may be pivoted around the swivel axis by a predetermined swivel range, wherein the movable mold half is fixed to the swivel element. The swivel element may be provided with a swivel range limiting element to limit the swivel range. The swivel range limiting element may be designed so that the maximum swivel range may be set.

One of the two mold halves may be made of two separate parts which, in the crack gap position, are able to adopt a different spacing from one another as compared with the closed position. The separate parts may thus be brought over a different path from the crack gap position into the closed position, thereby compressing the different areas of the particle foam part with different strength. One or both mold halves may also be made of more than two separate parts, which may be arranged in the crack gap position independently of one another with a differing distance from the respective other mold half.

Preferably each of the two mold halves is mounted on a clamping platen, wherein at least one part of one of the two mold halves is designed to be movable relative to the corresponding clamping platen.

Between the clamping platens, spring-loaded spacer elements may be provided, with which the clamping platens may be held at a distance, by means of the spring effect of the spacer elements, in such a way that the two mold halves are in the crack gap position.

The clamping platens may be pressed together against the spring effect of the spacer elements, so that the mold halves are brought into the closed position of the mold. In the course of this, parts of the mold halves may be moved over a different movement path.

One of the two mold halves may be joined to the corresponding clamping platen for example by means of a swivel joint.

The movable part of the mold half may be mounted so as to be freely movable relative to the clamping platen within a predetermined range of movement. With such a design, this mold half is used as the upper mold half so that, on account of its weight, it assumes a greater distance from the clamping platen in the crack gap position than in the closed position of the mold. The movable part or parts are therefore, in this embodiment, lowered a little in the crack gap position on account of weight alone.

Between the movable part or parts and the corresponding clamping platen it is also possible to provide a spring element, which presses the movable part or parts away from the clamping platen. Such a mold half may also be used as the bottom mold half of a mold wherein, in the crack gap position, the movable part or parts of the mold half are pressed away from the relevant clamping platen. This kind of design of the mold halves may also be used for a crack gap mold in which the two mold halves are arranged roughly vertically.

One of the two mold halves may have a section with a through hole which, in the crack gap position, bounds a hollow space formed between the two mold halves, and in the closed position of the crack gap mold, fits against the outside of the other mold half. This through hole thus forms in the crack gap position a free passage into the hollow space, and in the closed position this through hole is closed. Such a through opening may be used for the supply of foam particles and/or for the escape of air. It is also possible to provide several through holes, with one through hole being used to supply foam particles and the other through hole used for the escape of air.

The through holes are closed automatically in the changeover from the crack gap position into the closed position of the crack gap mold. This means that it is not necessary to provide an additional closing mechanism, which may therefore be omitted.

A feed pipe for the supplying of foam particles may therefore be connected directly to this mold, without having to provide a filling injector for this purpose. Such a filling injector is known e.g. from WO 2015/091906 A1, to the full content of which reference is hereby made.

An apparatus for the production of a particle foam part includes a crack gap mold, as described above, a conveyor to feed foam particles to the crack gap mold, and a heating device for heating the foam particles in the crack gap mold so that they weld together.

The heating device may be a radiation source for electromagnetic radiation. In particular, the radiation source may be a radiation source for RF radiation. The mold is then preferably made, at least in the areas between the mold cavity and the radiation source, of materials which are transparent or substantially transparent to electromagnetic radiation. The mold halves may be made, on their surfaces which bound the mold cavity, from a material which absorbs a portion of the electromagnetic radiation, so that the surfaces of the mold halves heat up when the electromagnetic radiation is applied.

The heating device may also be a device for the generation and supply of steam to the crack gap mold. The steam is preferably saturated dry steam.

According to a further aspect of the present invention, a particle foam part is provided with a roughly wedge-shaped body, in which the foam particles have roughly the same density over the whole body of the particle foam part.

The particle foam part is preferably made using a mold as described above.

Figure 1B:
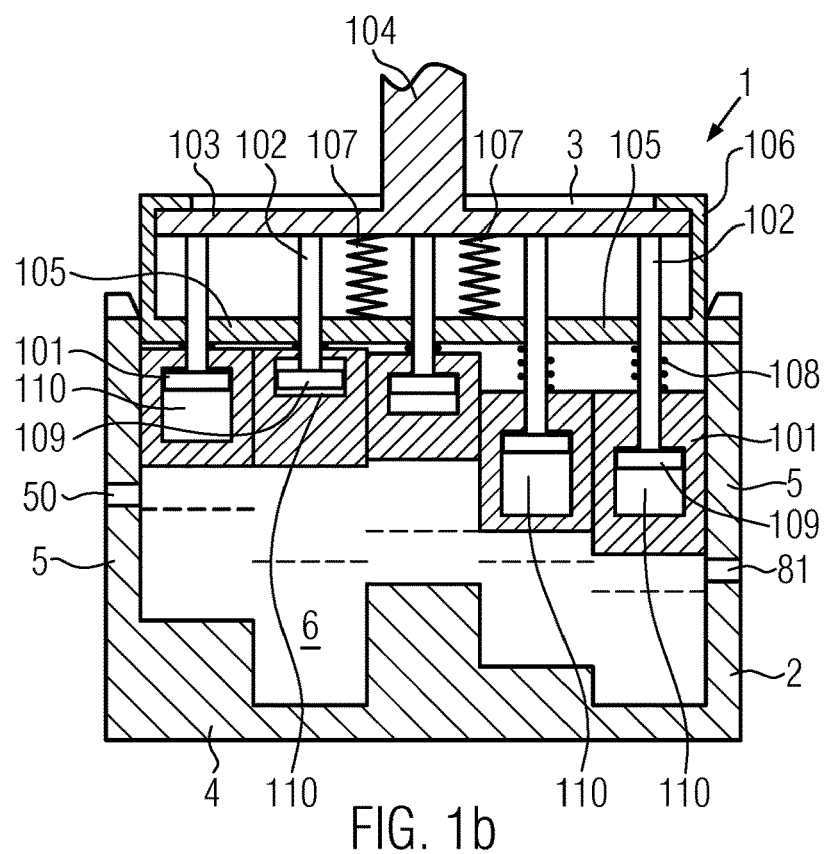
Figures 2A, 2B:
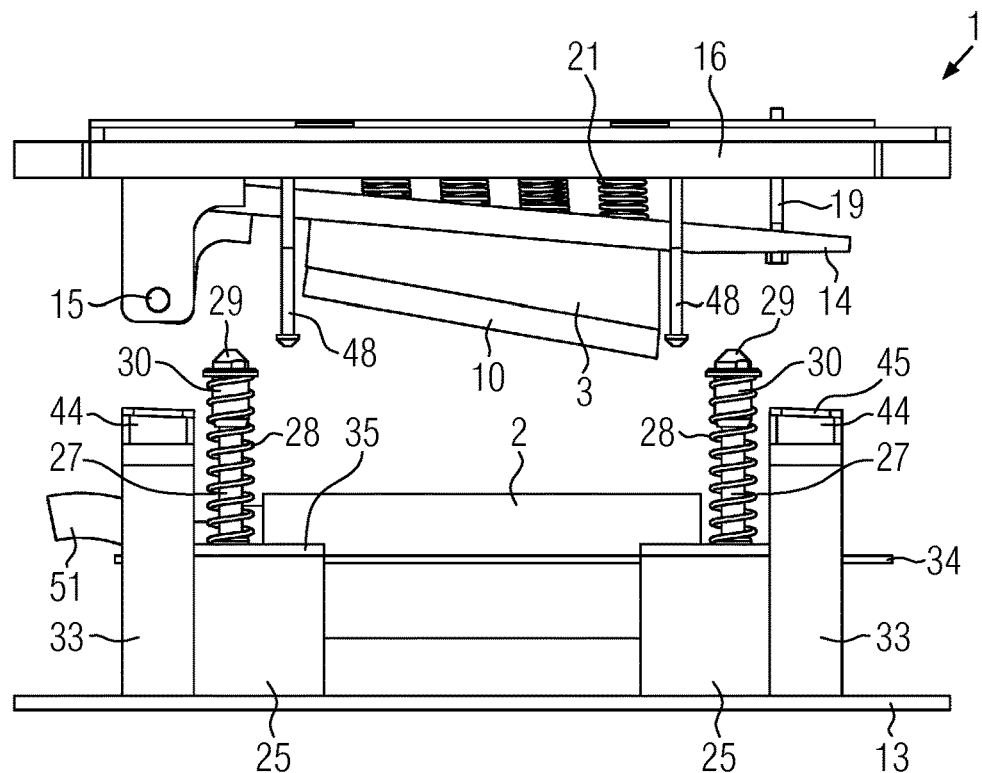
Figure 2C:
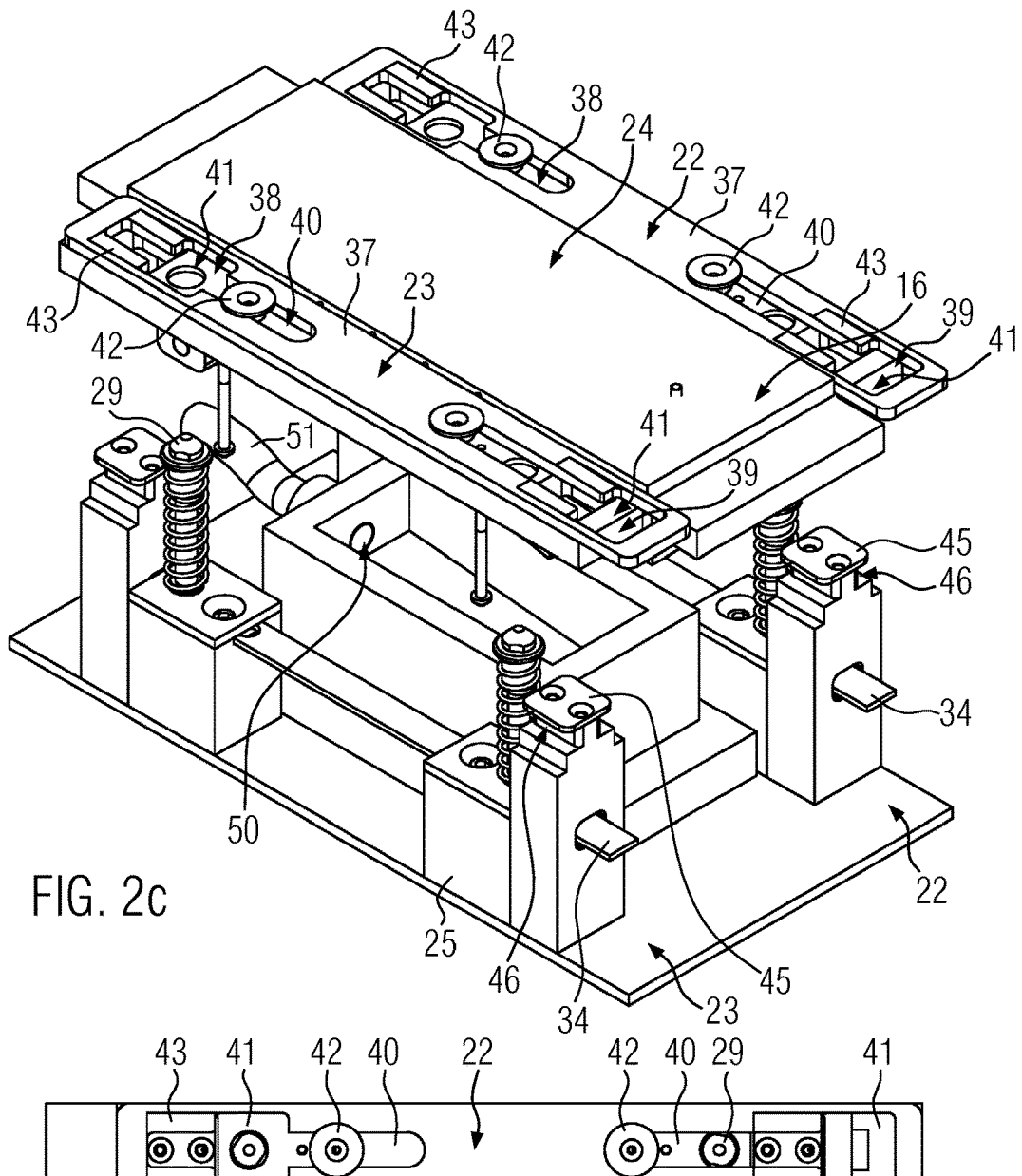
Figure 2D:
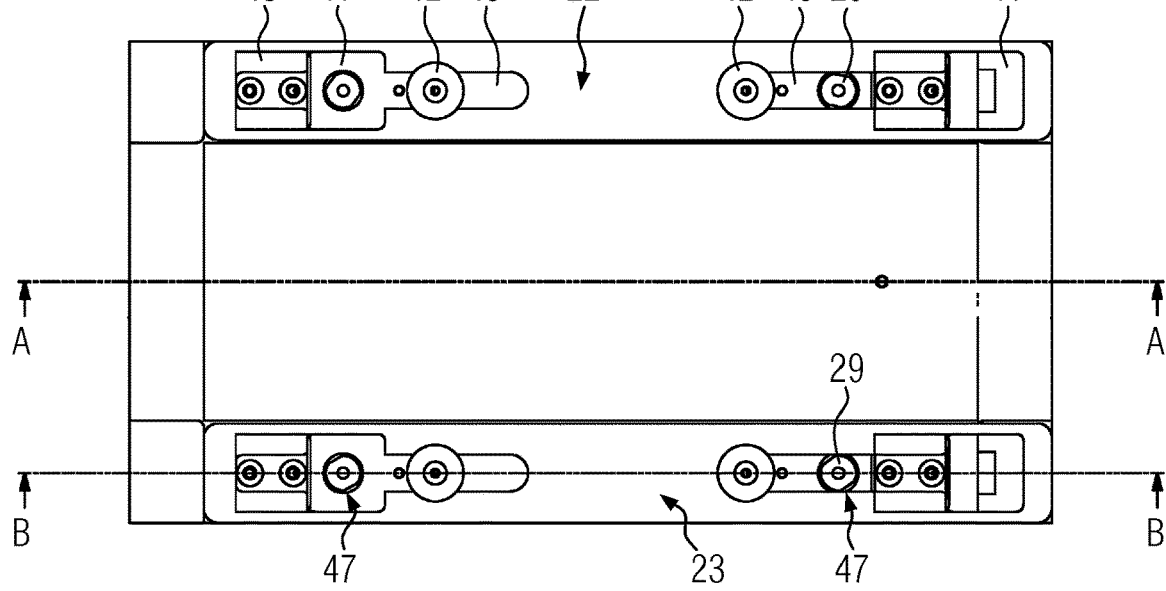
Figure 2E:
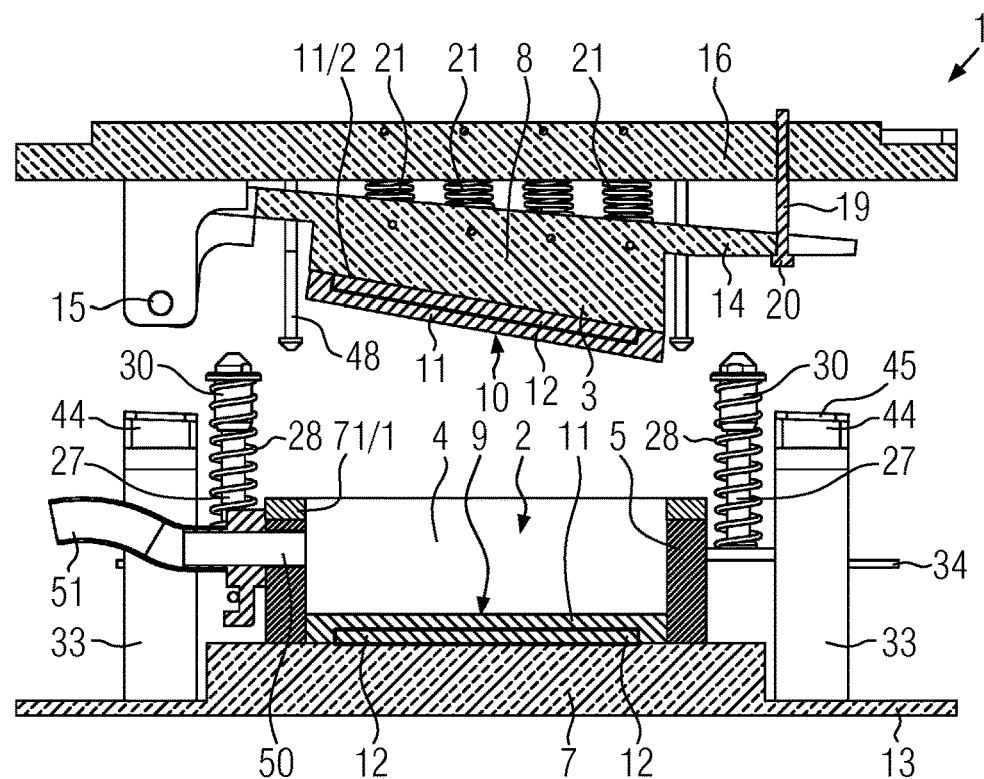
Figure 2F:
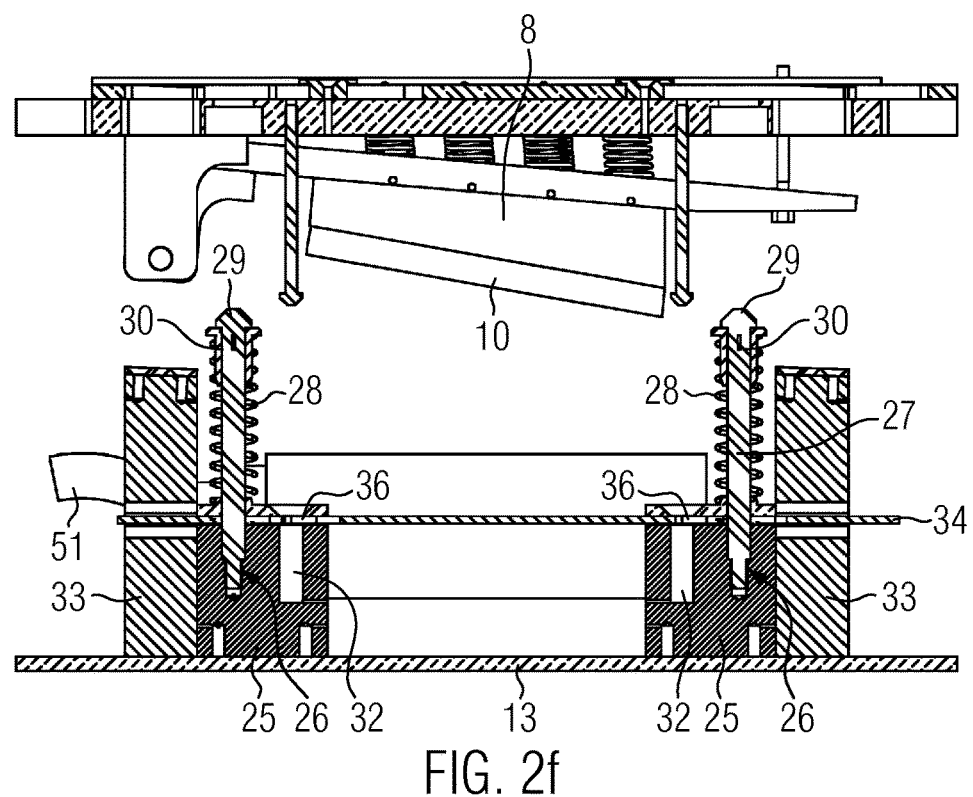

The invention is explained in detail, by way of example, with the aid of the drawings, which show in:

FIGS. 1a, 1b a first embodiment of a crack gap mold with two mold halves in a sectional view in a closed position and in a crack gap position FIGS. 2a-2f a crack gap mold with two mold halves separated from one another, in a side view, front view, perspective view, top view and two sectional views, wherein the sectional view according to FIG. 2e runs along the line A-A and according to FIG. 2f runs along the line B-B in FIG. 2d.

Figure 3A:
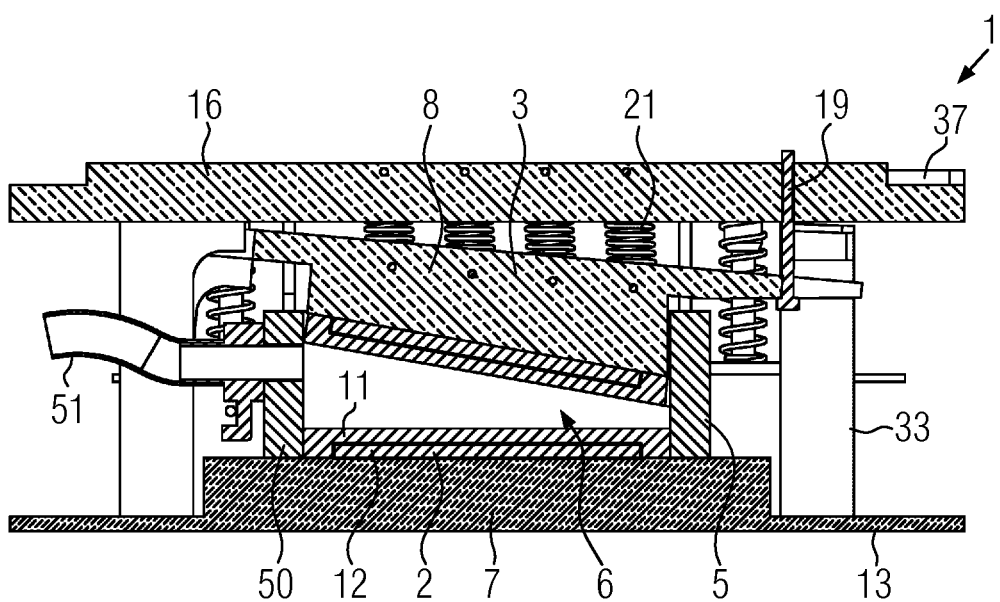
Figure 3B:
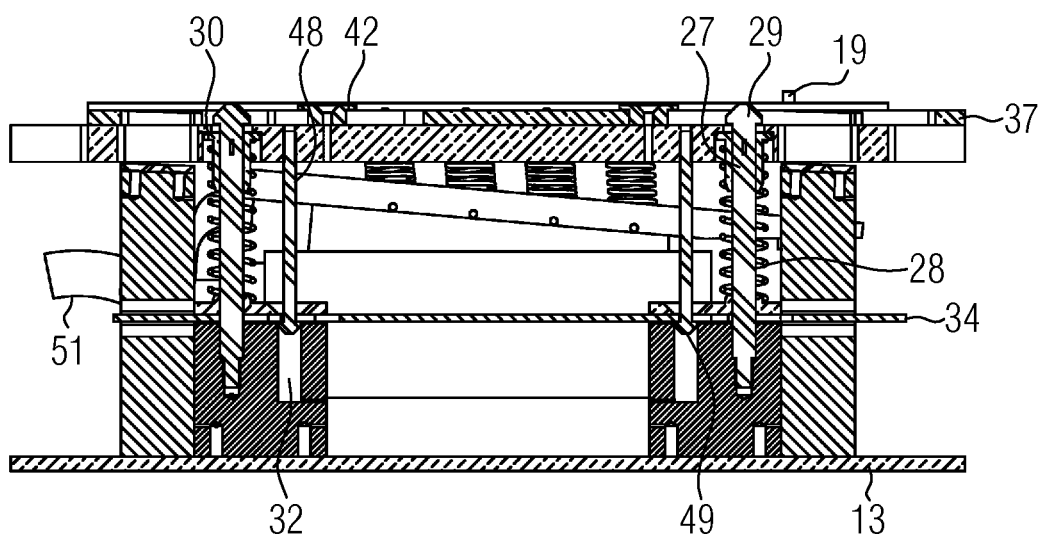

FIGS. 3a, 3b the crack gap mold according to FIGS. 1a to 1f in a crack gap

Figure 4A:
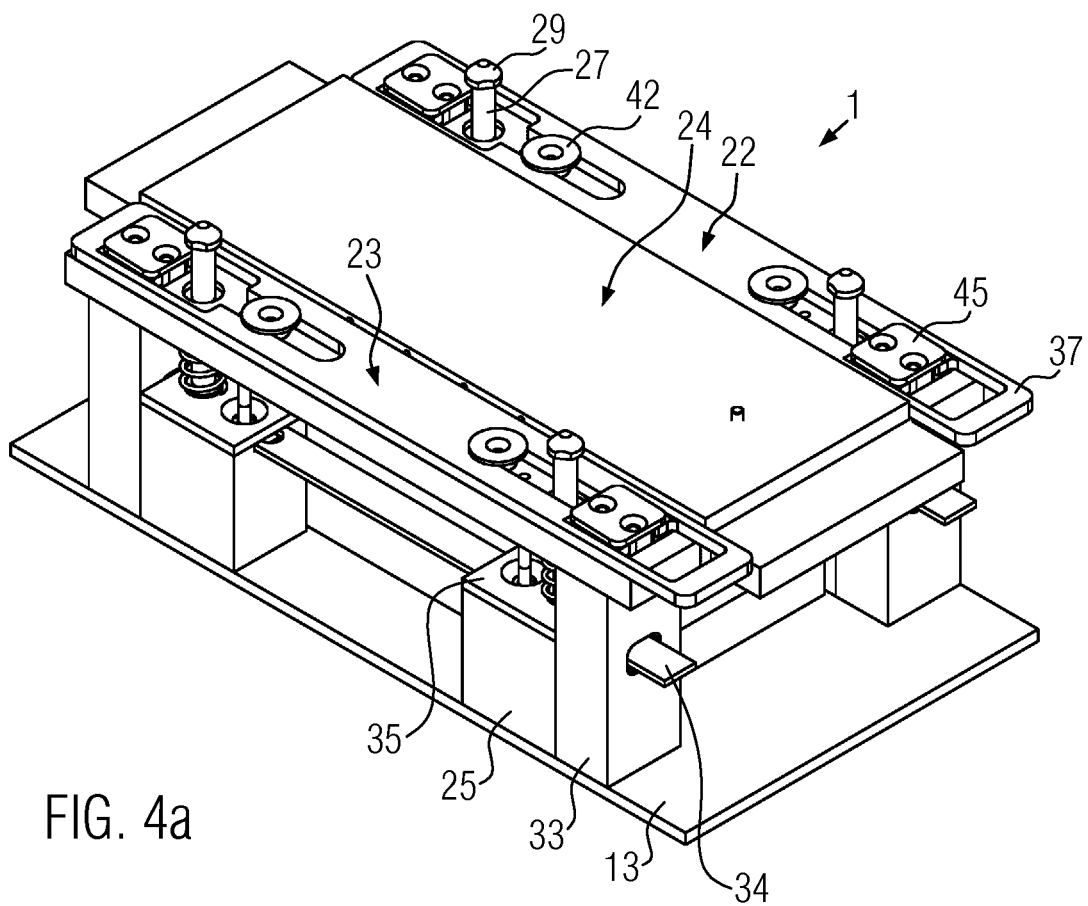
Figure 4B:
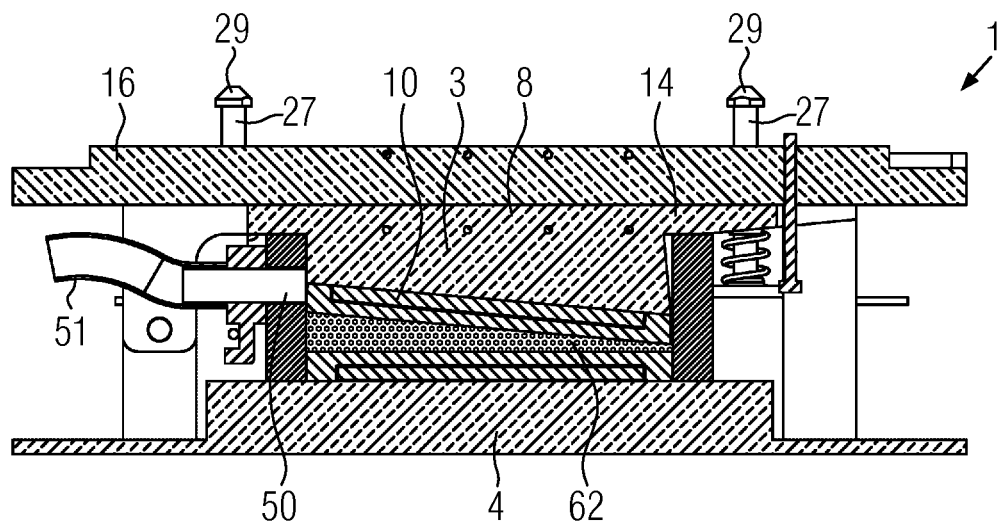
Figure 4C:
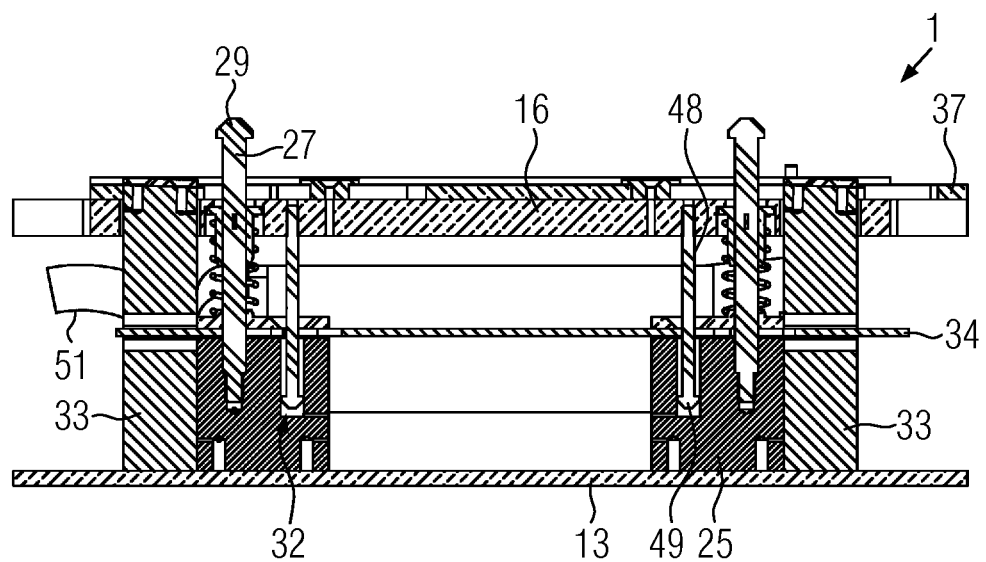
Figure 5:
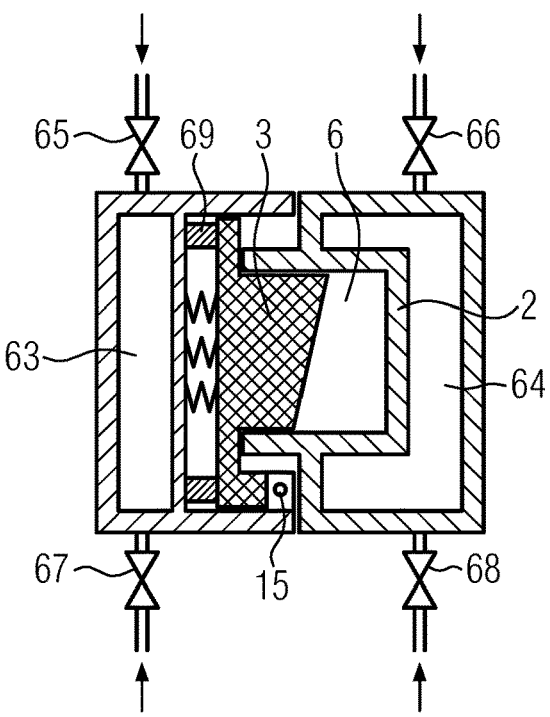
Figure 6:
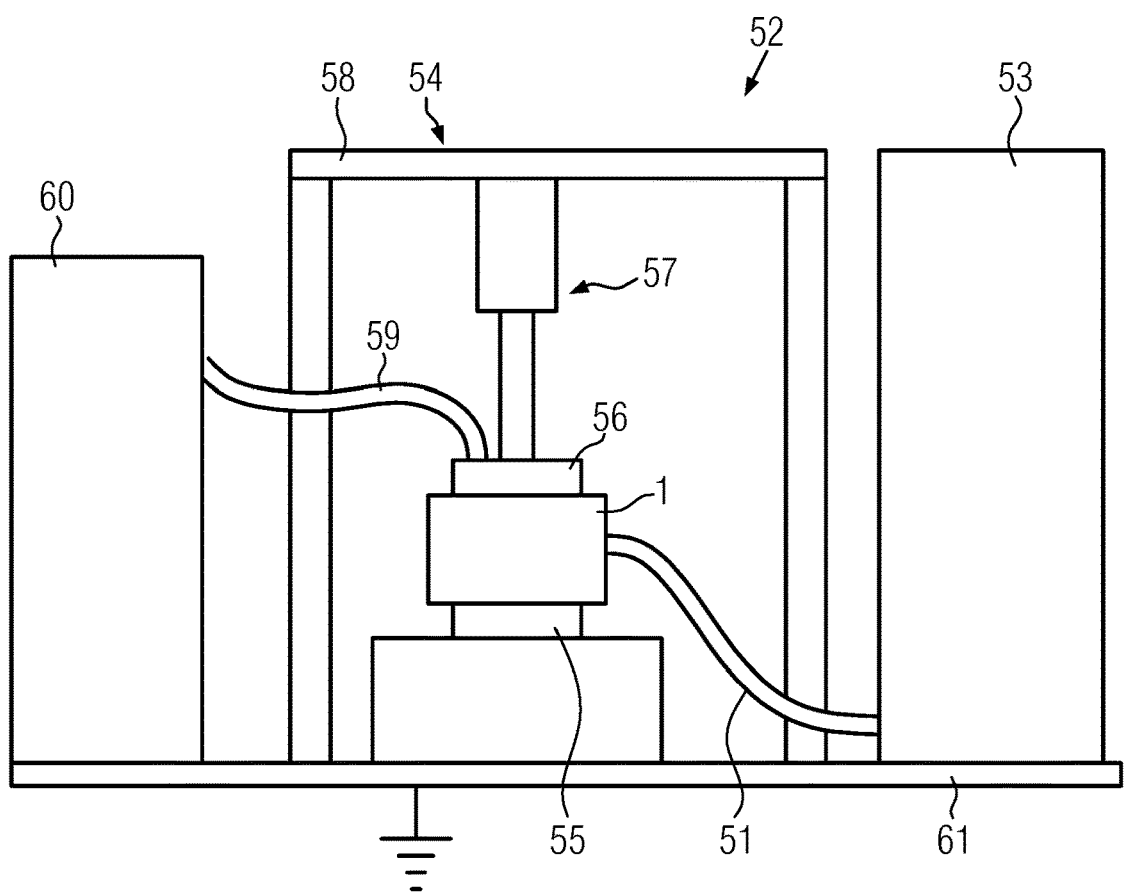
Figure 7:
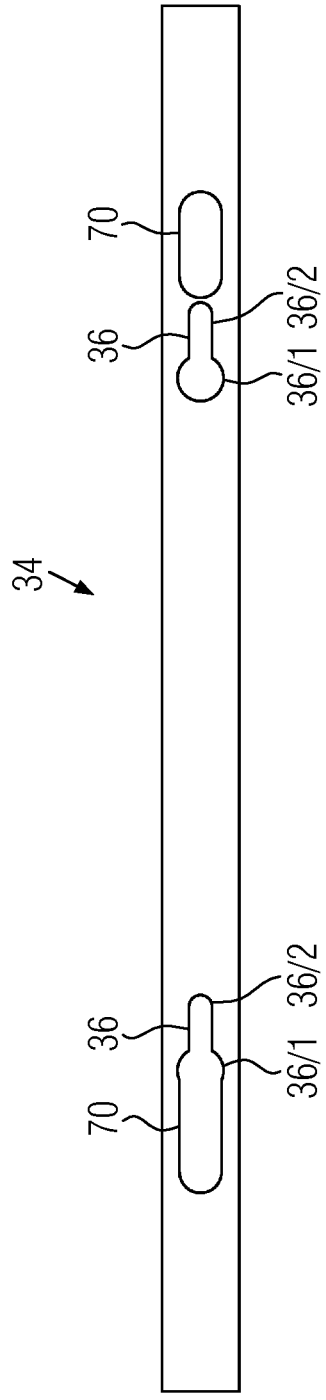
Figure 9A:
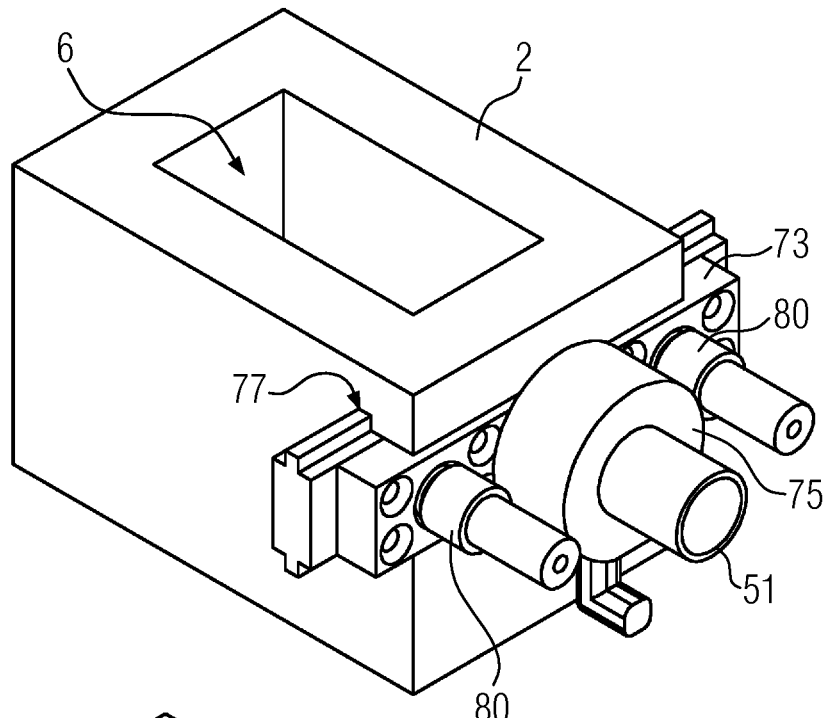
Figure 9B:
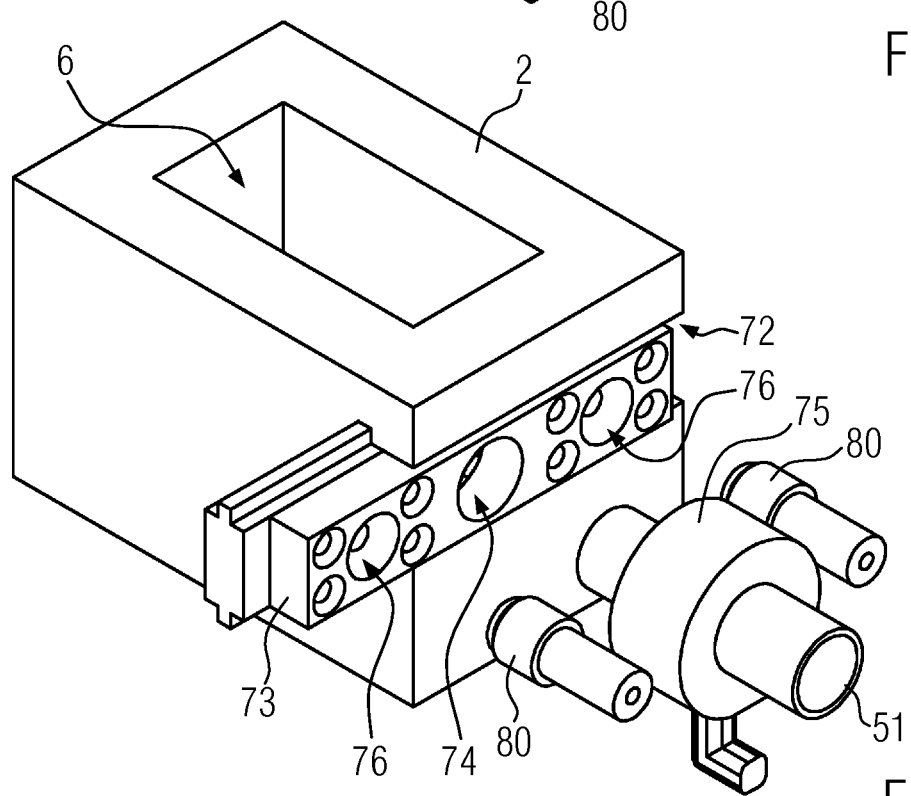
Figure 10:
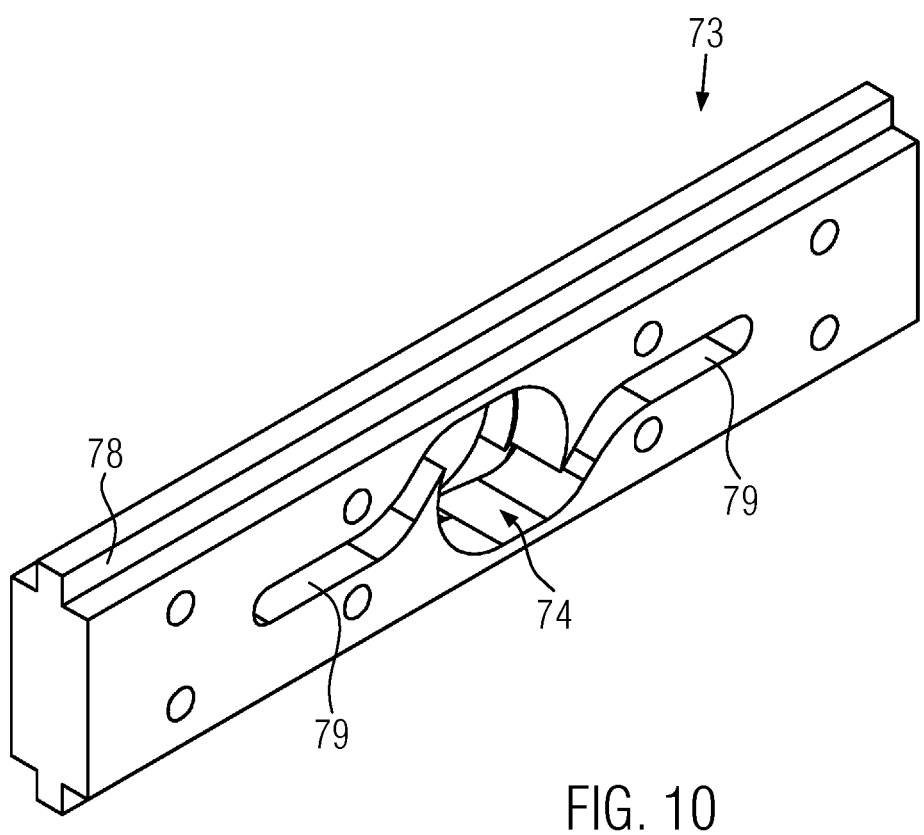

FIGS. 4a-4c the crack gap mold according to FIGS. 1a to 1f in a closed position in a perspective view and in two sectional views FIG. 5 a sectional schematic view of a crack gap mold in which steam for welding of foam particles may be fed into a mold cavity, and FIG. 6 a schematic view of an apparatus for the production of particle foam parts with an RF-generator, FIG. 7, 8 respectively a locking strip in a top view, FIG. 9a, 9b a die mold half with a slide for closing a filler hole in a perspective exploded view, and FIG. 10 the slide from FIGS. 9a and 9b in a perspective view.

A first embodiment of a crack gap mold 1 according to the invention for the production of a particle foam part has two mold halves 2, 3. Mold half 2 is made of a base 4 and a continuous side wall 5 (FIGS. 1a, 1b). The other mold half 3 is designed as a kind of punch, which may be inserted with minimal play into the area bounded by the continuous side wall 5, so that a mold cavity 6 is defined between the two mold halves 2, 3. Mold half 3 is therefore described as punch mold half 3 and mold half 2 as die mold half 2.

The punch mold half 3 has several separate punches 101, each connected by means of an actuating punch 102 to an actuating plate 103. The actuating plate 103 is connected to a piston rod 104 of a press, in order to move the punch mold half 3 relative to the die mold half 2 and in particular to insert the punch mold half 3 in the die mold half 2.

Located in the area between the separate punches 101 and the actuating plate 103 is a counter-plate 105 which has through holes through each of which there extends an actuating punch 102. The counter-plate 105 has a frame 106 extending in the direction of the actuating plate 103 which encompasses the actuating plate 103 in such a way that the counter-plate 105 and the actuating plate 103, which are mounted parallel to one another, are movable towards one another, while the maximum movement distance is limited by the frame 106.

The actuating punches 102 are connected by one end to the actuating plate 103 and extend with their axial direction perpendicular to the plane of the actuating plate 103. The counter-plate is movable relative to the actuating plate 103 in the axial direction of the actuating punch 102.

Provided between the actuating plate 103 and the counter-plate 105 are spring elements 107, which press the two plates 103, 105 away from one another.

Provided in each case between the respective separate punch 101 and the counter-plate 105 is a further spring element 108 which presses the separate punch 101 and the counter-plate 105 away from one another. The spring element 108 is preferably a coil spring, while in each case one of the actuating punches 102 extends through the inner part of the coil spring.

The actuating punches 102 have in each case at their end furthest away from the actuating plate 103 an actuating piston 109, each of them resting in a cylinder space 110, formed in each case in one of the separate punches 101. The cylinder space 110 is so formed that the actuating piston 109 is mounted in it with minimal play, so that the actuating piston 109 may be shifted in the cylinder space 110 between two settings.

Formed in the side wall 5 is a filler hole 50 for feeding foam particles into the mold cavity 6.

In addition, a vent hole 81, from which air can escape during filling of the mold cavity 6, may also be provided in the side wall 5.

In operation, the mold may be used in three different positions: a position (not shown) in which the two mold halves 2, 3 are completely separated from one another, so that a particle foam part produced with the mold may be demolded, and a crack gap position (FIG. 1b) in which the punch mold half 3 is inserted so far into the die mold half 2 that the mold cavity 6 is closed, but the mold cavity 6 is not yet reduced to its final volume in the closed position (FIG. 1a).

In the crack gap position the filler hole and the vent hole 81 are not covered by the punch mold half 3, so that these through holes 50, 81 communicate with the mold cavity 6, and foam particles may be fed in and/or air taken away. In the crack gap position, on account of the spring elements 107, the actuating plate 103 and the counter-plate 105 are pressed apart and have the maximum distance from one another. Moreover, the separate punches 101 are pressed by the spring elements 108 away from the counter-plate 105, so that the actuating pistons 109 on the separate punches 101 each strike against the wall of the separate punches 101 facing towards the counter-plate 105. The separate punches 101 are therefore in the furthest position away from the actuating plate 103. This furthest removed position is limited by the actuating piston 109 in the cylinder space 110.

In the crack gap position, the mold cavity 6 is filled with foam particles. The punch mold half 3 is then pressed a little further into the die mold half 2, which compresses the foam particles to be found there. Through the pressure generated in this way, the separate punches 101 are pressed in the direction of the counter-plate 105 and actuating plate 103 respectively. By this means, the separate punches 101 move relative to the respective actuating punch 102 in such a way that the actuating pistons 109 strike against the wall of each separate punch 101 which faces away from the actuating plate 103 (FIG. 1a). The respective separate punches 101 are thus pressed by one of the actuating punches 102 against the foam particles.

The distance covered by the separate punches 101 in the transition from the crack gap position into the closed position is therefore the distance covered by the actuating plate 103 less the free path of the respective actuating piston 109 in the cylinder space 110. The further the cylinder space 110 extends in the direction of movement of the actuating piston 109 relative to the separate punches 101, the shorter is the movement path of the individual separate punches 101 in the transition from the crack gap position into the closed position. By this means, the foam particles may be compacted over a different distance in the individual areas of the mold cavity. If this compaction path is proportional to the thickness of the particle foam part to be produced in the area concerned, then it is possible to obtain uniform compaction over the whole particle foam part, even though it has variations in thickness. It is however also possible to generate specifically varying compaction of the foam particles, in order e.g. to obtain especially high strength in thin-walled sections. In FIG. 1b the positions of the separate punches are shown in the end position depicted by a dotted line.

Using this mold, the foam particles may be welded by means of electromagnetic waves, in particular RF radiation. For this purpose it is expedient if the mold halves 2, 3 are made of an electrically conductive material, so that they can serve as capacitor plates for the electromagnetic field. The mold halves are here, however, at least in the areas in which they touch each other, coated with an electrically insulating layer, in particular a plastic coating. Preferably, in such an embodiment, the continuous side wall 5 is not electrically conductive, e.g. being made of plastic, so that in the edge area there are no very small clearances between the capacitor plates, which would lead to locally very strong electrical fields.

This mold may however also be used for welding foam particles using steam. In this case, suitable steam chambers and passages are to be provided around the mold halves, so that steam may enter the mold cavity 6 through the mold halves.

In the embodiment described above it is in principle also possible to omit the counter-plate 105.

A further embodiment of a crack gap mold 1 for the production of a particle foam part has once again two mold halves 2, 3. Mold half 2 is made of a base 4 and a continuous side wall 5 (FIG. 2e). The other mold half 3 is designed as a kind of punch, which may be inserted with minimal play into the area bounded by the continuous side wall 5, so that a mold cavity 6 is defined between the two mold halves 2, 3 (FIG. 3e). Mold half 3 is therefore described below as punch mold half 3 and mold half 2 as die mold half 2. Both mold halves 2, 3 have a framework 7, 8 of an electrically conductive material, in particular metal. The frameworks 7, 8 each have in the present embodiment a flat surface facing the mold cavity 6. On this surface is provided in each case a mold body 9, 10, which has a surface bounding the mold cavity 6 with a contour complementary to the particle foam part to be produced. The mold bodies 9, 10 are made of a dielectric material. In principle they may be made of several material layers, wherein it is in particular expedient if the outer layer, forming a casing 11 and directly bounding the mold cavity 6, absorbs electromagnetic radiation, in particular RF radiation, to a certain extent, while the other layer, distant from the mold cavity 6 and forming a core 12, is substantially completely transparent to this radiation. In the present embodiment, the mold bodies 9, 10 are therefore made of a casing 11 which absorbs electromagnetic radiation and a core 12 which is transparent to electromagnetic radiation. The core 12 and the surrounding casing 11 have preferably the same permittivity (dielectric constant). Through this design of the mold bodies 9, 10, on the one hand a homogenous electrical field is applied to the mold cavity 6, and on the other hand the casing 11 is heated when electromagnetic radiation is applied, so that sufficient heat is available even in the surface area of a particle foam part to be produced.

The continuous side wall 5 is made of a dielectric material which can absorb or is transparent to the electromagnetic radiation.

The play between the punch mold half 3 and the continuous side wall 5 of the die mold half 2 is less than the size of individual foam particles which may be welded by the mold into a particle foam part. The side wall 5 has, at least in the area in which the punch mold half 3 dips into the die mold half 2, an inner surface in the form of a straight cylinder. The remaining area of the inner surface of the side wall 5 may be freely contoured, with a contour which is complementary to the particle foam part to be produced.

The framework 7 of the die mold half 2 is, on the side facing away from the mold cavity 6, integral with the clamping platen 13, which extends outwards in all directions a little beyond the mold half 2 and the area of the mold cavity 6 respectively. Viewed from above, the clamping platen 13 has a rectangular shape.

The framework 8 is, on the side facing away from the mold cavity 6, integral with a swivel plate 14, which extends outwards over the mold cavity 6 bordered by the side wall 5.

The swivel plate 14 is attached pivotably at a swivel axis 15 to a further clamping platen 16. Relative to this clamping platen 16, the punch mold half 3 is arranged on the side facing towards the die mold half 2. Formed on the clamping platen 16 and the swivel plate 14 are corresponding swivel levers 17, 18, so that the swivel axis 15 is offset a little from the surface of the clamping platen 16 in the direction of the die mold half 2. The position of the swivel axis 15 is to be selected so that, on wetting of the crack gap mold 1, a desired compaction of the foam particles in the different areas is effected on account of the swiveling movement.

In the area of the swivel plate 14 and the clamping platen 16 respectively which is removed from the swivel axis 15, a threaded bolt 19 is screwed into a drilled hole in the clamping platen 16 in such a way that it protrudes on the side of the clamping platen 16 facing the mold cavity 6 and extends through a corresponding slit-like opening in the swivel plate 14.

The threaded bolt 19 has on its end furthest away from the clamping platen 16 a bolt head 20 which, viewed from above, is larger than the corresponding passage in the swivel plate 14, so that the swivel range of the swivel plate 14 relative to the clamping platen 16 is limited by this bolt head 20. This threaded bolt 19 thus forms a swivel range limiting element. The swivel range may be adjusted by varying the strength with which the threaded bolt 19 is screwed into the clamping platen 16. The threaded bolt 19 may also protrude slightly outwards from the clamping platen, as shown for example in FIGS. 2a and 2b. With such a design, a suitable recess is to be provided in a press used to press together the crack gap mold 1.

In the present embodiment, several spring elements 21 are provided between the clamping platen 16 and the swivel plate 14; they press the swivel plate 14 and with it the punch mold half 3 away from the clamping platen 16. The spring elements 21 are coil springs, fastened by their respective ends to the clamping platen 16 and the swivel plate 14 respectively.

If the mold half fastened pivotably to one of the clamping platens is always so arranged in operation that it is above the mold cavity, then the spring elements may even be dispensed with, since the mold half on account of force of gravity swivels downwards and therefore away from the clamping platen. The use of such spring elements is however advantageous, since the spring force may be set by the choice of suitable spring elements.

Provided on two opposite edge areas 22, 23 of the clamping platens 13, 16 are various elements for setting the spacing between the two clamping platens 13, 16 and between the mold halves 2, 3 respectively. These element are so designed that they do not protrude or else protrude only slightly at a central outer surface 24 of the clamping platens, so that the crack gap mold 1 may be pressed together by a press at these central outer surfaces of the clamping platens 13, 16 (FIG. 2c). Small projections on the clamping platen 16 may be held by a press with a suitable contoured surface. Such a contoured surface of a press is advantageous in preventing the clamping platens from adhering to the press surfaces after a pressing operation.

On the bottom clamping platen 13, in each case two bases 25 are attached at the edge areas 22, 23. Each of the bases 25 has blind-hole-like tapped holes 26 to accommodate a spring pin 27. Each spring pin 27 is screwed at one end into the tapped hole 26 and each spring pin 27 is encompassed by a coil spring 28. The spring pins 27 have at their free end a spring pin head 29. A spring pin bushing 30 encompasses the spring pin 27 and has a radially outwards extending collar 31, with which the spring pin bushing makes contact with the spring pin head 29. The coil springs 28 extend between the collar 31 of the spring pin bushing 30 and the base 25 and are pre-stressed in the unloaded state.

The bases 25 also have blind-hole-like guide bores 32 (FIG. 2f), the openings of which face towards the top clamping platen 16 and the punch mold half 3 respectively. Adjacent to the base 25, spacer columns 33 are provided in the edge areas 22, 23 of the bottom clamping platen 13. The spacer columns 33 extend from the bottom clamping platen 13 a short distance over the base 25 towards the top clamping platen 16. The spacer columns 33 do not however extend so far upwards as the free ends of the spring pins 27.

On the top side of the base 25 facing away from the bottom clamping platen 13, a locking strip 34 is provided in each of the edge areas 22, 23. The locking strip 34 is made of a narrow metal strip and guided in a corresponding slot in the bases 25. The bases 25 have a cover 35, which extends over the locking strips 34, thereby holding them in the slot. The locking strips 34 extend through corresponding through holes in the spacer columns 33 and are made long enough to protrude with at least one end into the spacer columns 33. The locking strips 34 are movable in their axial direction, while having in each case elongated holes 70 in the area of the spring pins 27. Here the length of the elongated holes determines the maximum movement path of the locking strips 34. In addition the locking strips 34 have, in the area of the guide bores 32, locking through holes 36, which viewed from above have a wider roughly circular area 36/1 and a narrower elongated area 36/2 and are arranged consecutively in the axial direction (FIG. 7). The wider area 36/1 is so wide that, when it is provided in the area of the guide bores 32, the opening of the guide bore 32 is completely free. The narrower areas 36/2 of the locking through hole 36 are narrower than the clear width of the guide bores 32. If the spring pins 27 are positioned very close to the guide bores 32, the corresponding elongated hole 70 and the locking through hole 36 are able to form a common recess.

Figure 8:
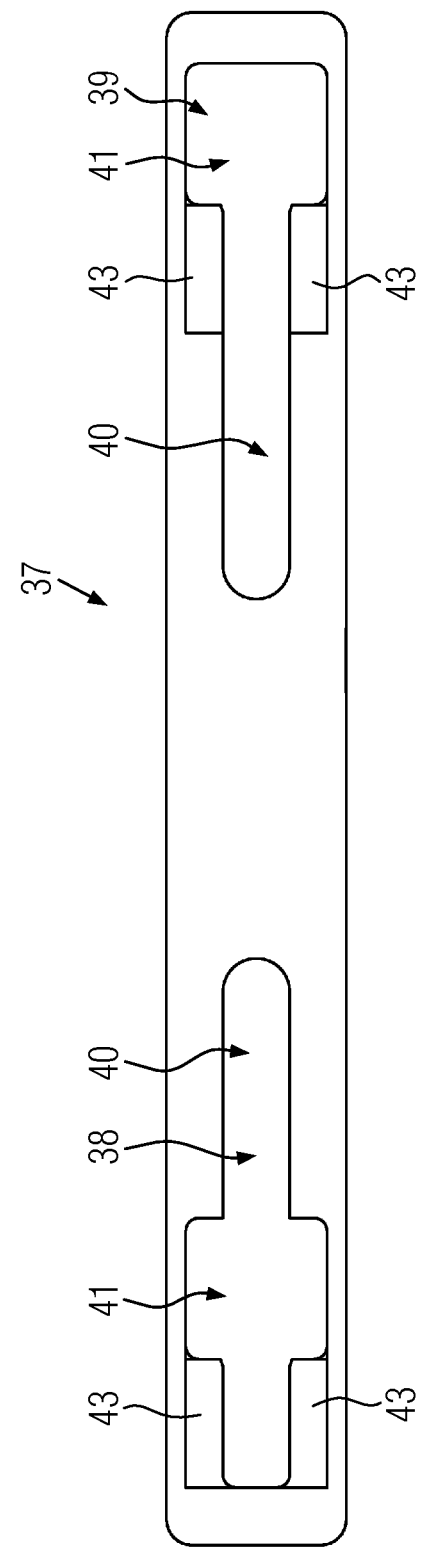

In the area of the edge areas 22, 23, a further locking strip 37 is fitted to the top clamping platen 16. In the area of the locking strip 37, the outside of the clamping platen 16 is recessed in the manner of a step, so that the outer side of the locking strip 37 does not protrude at the central outer surface 24 (FIG. 8).

The locking strips 37 are in the form of narrow metal strips, each having two through holes 38, 39 which, viewed from above, have a narrow opening area 40 and a wide opening area 41. The wide opening areas 41 are each located at the end sections of the locking strips 37, and the narrow opening areas 40 adjoin the wide opening areas 41 in the direction of the longitudinal center of the locking strips 37. Provided in each case in the area of the narrow opening area 40 is a flat rivet 42, so that the locking strips 37 are fixed in the axial direction but movable on the clamping platen 16.

The wide opening areas 41 have in each case two tongues 43, extending inwards at the side. The tongues 43 extend roughly over half the longitudinal extent of the wide opening area 41 and are somewhat tapered at the end facing the other wide opening area 41, thus forming a wedge in each case.

Each of the free ends of the spacer columns 33 has a web 44 running in the axial direction of the edge areas 22, 23 and to which is attached a small plate 45 protruding on both sides, so that in the axial direction of the edge areas 22, 23 in each case two slots 46 are formed. The size of the small plate 45 in the top view is slightly smaller than the wide opening area 41 without tongues 43. This means that the free end of the spacer columns 33 may be guided through the through holes 39.

By shifting the locking strips 37, the tongues 43 are inserted in the slots 46, and the clamping platen 16 is firmly connected to the spacer columns 33 and thereby to the rest of the clamping platen 13 in the closed position of the crack gap mold 1 (FIGS. 4a-4f).

The top clamping platen 16 has in the edge areas 22, 23 a total of four through holes 47, wherein each through hole has a spring pin head 29 of the bottom clamping platen 13 lying opposite, so that during pressing together of the two clamping platens 13, 16, the spring pin heads 29 pass through the through holes 47, with the spring pin bushings striking against the bottom of the top clamping platen 16 and the coil spring 28 being slightly compressed. The four through holes 47 are thus arranged in the same grid as the four spring pins 27. The through holes 47 of the top clamping platen 16 are located in the area of the through holes 39 of the locking strips 37, so that the spring pin heads 29 do not collide with the locking strips 37.

On the side of the clamping platen 16 facing the mold cavity 6, vertically protruding guide pins 48 are arranged in the grid of the guide bores 32. The guide pins 48 each have a guide pin head 49 at their free end. The guide pin heads 49 are conical in form, so that they form insertion bevels. The guide pin head 49 is so dimensioned that it fits in each case with some play in a guide bore 32. The guide pin heads 49 are however sufficiently large that they are held back from the narrow area of the locking through holes 36 of the locking strips 34, so that the guide pin heads 49 inserted in the guide bores 32 may be locked by shifting the locking strips 34 into the guide bores 32. The guide pins 48 therefore form together with the guide bores 32 and the locking strips 34 a loss prevention device which prevents separation of the two clamping platens 13, 16 and of the two mold halves 2, 3 respectively.

Formed on the side wall 5 of the die mold half 2 is a filler hole 50 to which a filler hose 51 is connected. The latter leads to a supply tank 53, from which foam particles may be drawn and fed to the mold cavity 6. Since in the closed position of the crack gap mold 1, the filler hole 50 of the die mold half 2 is covered by the punch mold half 3 (FIG. 4e), it is not necessary to provide a special closing mechanism at the filler hole 50. It may however be expedient to make the filler hose 51 releasable and, with the crack gap mold 1 closed, to insert a plug of a dielectric material with a similar dielectric constant to that of the material of the side wall 5. In this way, inhomogeneities in electrical fields in the area of the filler hole 50 may be avoided. In the present embodiment, the die mold half 2 has no vent hole. If the two mold halves 2, 3 close tightly together, then a vent hole may be necessary. If a vent hole is provided then it may be sensible, in the closed state of the crack gap mold 1, to insert a plug of a dielectric material with a similar dielectric constant to that of the material of the side wall 5.

This crack gap mold 1 may be used in an apparatus 52 for the production of particle foam parts (FIG. 6). Such an apparatus has a supply tank 53 which is connected by the filler hose 51 to the crack gap mold 1. The crack gap mold 1 is mounted in a press 54 which has a press table 55, a press punch 56, a cylinder-piston unit 57 for moving the press punch 56 and a stable frame 58 to which the cylinder-piston unit 57 and the press table 55 are fastened. The press punch 56 is made from an electrically conductive metal plate. The press punch 56 is connected via a waveguide 59, e.g. in the form of a coaxial cable, to an RF generator 60. The press table 55 has an electrically conductive table top of metal, which is connected to earth via an electrically conductive baseplate 61.

The use of the crack gap mold 1 to produce a particle foam part in the apparatus 52 will be explained below.

To begin with, the crack gap mold 1 is in a crack gap position, in which the guide pins 48 are locked in the guide bores 32 by means of the locking strips 34 (FIGS. 3a-3f), and the clamping platens 13, 16 are held at the maximum distance apart by the coil springs 28, which is allowed by the guide pins 48. Here the punch mold half 3 is inserted so far into the die mold half 2 that the mould cavity 6 is essentially closed. Relative to the top clamping platen 16, the punch mold half 3 is deflected by the maximum possible angle of swivel. In this crack gap, the crack gap mold 1 is inserted into the press 54. The filler hose 51 is connected to the filler hole 50 of the crack gap mold 1.

Foam particles are fed from the supply tank 53 to the mold cavity 6. When the mold cavity 6 is completely filled with foam particles, then the cylinder-piston unit 57 is actuated in order to press together the two clamping platens 13, 16 and with them the two mold halves 2, 3. The crack gap mold is thus brought into the closed position (FIGS. 4a-4f). By this means, the foam particles in the mold cavity 6 are compressed and, through the pressure generated thereby, the punch mold half 3 is swiveled around the swivel axis 15 towards the top clamping platen 16. This has the result that the movement path of the punch mold half 3 in the area further away from the swivel axis 15 is less than in the area adjacent to the swivel axis 15. In the present embodiment, the mold cavity 6 is somewhat wedge-shaped, with the area adjacent to the swivel axis being thicker than the area further away from the swivel axis. Due to the swiveling of the punch mold half 3, a uniform compaction of the foam particles over the whole wedge-shaped body of the particle foam part is obtained.

In the pressing together of the two mold halves 2, 3, the filler hole 50 of the die mold half 2 is covered by the punch mold half 3 and thereby closed. The filler hose 51 may then be removed from the crack gap mold 1. A plug with a similar dielectric constant to that of the side wall 5 may then be inserted in the filler hole 50.

In the pressed-together or closed state of the crack gap mold 1, the RF generator 60 is used to generate a high-frequency field which is applied to the punch mold half 3 via the waveguide 59 and the press punch 56. The die mold half 2 is connected to earth via the press table 55. The frameworks 7, 8 of the mold halves 2, 3 are electrically insulated from one another so that they act like a plate capacitor surrounding the mold cavity 6. By means of the electromagnetic field thus generated, the foam particles are heated and welded together into a particle foam part 62 (FIG. 4*e*).

In the closed state of the crack gap mold 1, before or after welding, it may be so locked by means of the locking strip 37 that the tongues 43 engage in the slots 46 of the spacer columns 33. The crack gap mold is thereby locked in the closed state. The press 54 may be opened and the crack gap mold 1 removed in the closed state. It may then be cooled by means of a suitable cooling device, such as for example a fan. While the crack gap mold 1, in which a particle foam part has already been formed, is cooled down, another crack gap mold 1 may be inserted into the press 54.

Once the particle foam part 62 has cooled sufficiently, the connection between the two mold halves 2, 3 is released by moving the locking strip 37, and the particle foam part 62 may be suitably demolded.

Crack gap molds for apparatus for the production of particle foam part, which weld the foam particles using steam, have long been known. The swiveling mechanism described above may equally be transferred to such a crack gap mold 1 (FIG. 5). Here however, the means of connecting the two clamping platens 13, 16 provided in the edge areas 22, 23 are not required, since the corresponding clamping platens in such an apparatus are fixed to the press elements (press punch and press table respectively) and the whole production process until cooling and demolding of the particle foam part is carried out within the press.

Provision is to be made, however, of steam chambers 63, 64, which are supplied with steam through valves 65, 66 or from which steam is drawn by valves 67, 68. The steam chamber 64 is integral with the mold half 23. Mold half 2 forms a die mold half, and mold half 3 a punch mold half which is connected to the steam chamber 63 by means of a swivel joint. Mold half 3 is thus mounted pivotably around a swivel axis 15. Mounted between the mold half 3 and the steam chamber 63 are spring elements 21 which press these two elements apart.

The two mold halves 2, 3 bound a mold cavity 6. The walls of the steam chambers 63 and 64 and mold half 3 adjoining the mold cavity 6 are permeable to steam. They are preferably perforated and/or made of a porous material. Provided between mold half 3 and steam chamber 63 is a continuous seal 69, so that steam may be exchanged in a controlled manner between the steam chamber 63 and the mold cavity 6.

In the embodiments described above, there is formed on the side wall of the die mold half 2 a filler hole 50, to which a filler hose 51 may be connected. If this filler hose 51 is removed, then the filler hole 50 may be closed by a plug made of a dielectric material.

FIGS. 9*a* to 10 show an alternative embodiment for a closure of the filler hole of a die mold half 2. The die mold half 2 is provided in the area of the filler hole with a recess 72 which is elongated and has a constant cross-sectional contour in the axial direction, so that it can hold a movable slide 73. The slide has a filler hole 74, to which the filler hose 51 may be connected with a suitable nozzle 75. The slide 73 also has at least one blowing air port 76. In the present embodiment the slide 73 is provided with two blowing air ports 76, with in each case one of the blowing air ports 76 being located on either side next to the filler hole 74 in the axial direction of the slide 73.

The slide 73 has in cross-section a profile which fits positively in the recess 72. In the present embodiment the recess 72 is provided with two slots 77, in each of which a corresponding spring strip 78 of the slide 73 engages. Formed in the side of the slide 73 facing the mold cavity 6 are channels 79 extending from the blowing air ports 76 in each case to the filler hole 74 and opening out at a tangent to the filler hole 74.

If air is blown in at the blowing air ports 76, then it enters tangentially in the area of the filler hole 74 and generates turbulence, which swirls up the foam particles to be found there.

By this means, after filling of the mold cavity 6, the filler hole of the die mold half 2 and the filler hole 74 of the slide 73 are blown free, so that the slide is able to move freely.

The slide can be moved between a position in which the filler hole 74 of the slide 73 coincides with the filler hole of the die mold half 2 (FIG. 9*b*) and a position in which the filler hole 74 of the slide 73 is offset relative the filler hole of the die mold half 2 (FIG. 9*a*). In the offset arrangement, the filler hole of the die mold half 2 is covered by the slide 73, but is however closed.

The slide 73 is preferably made of a material with the same permittivity and/or with the same dielectric loss factor as the rest of the body of the die mold half 2. This ensures that the slide, in the closed position according to FIG. 9*a*, does not change the electrical field in the mold cavity 6, since the filler hole of the die mold half 2, on account of the slide, is closed with a material with similar dielectric properties to the rest of the material of the die mold half 2.

The nozzle 75 and the corresponding nozzles 80 for connecting a compressed air line to each of the blowing air ports 76 may be handled automatically by a robot, so that the nozzles 75, 80 are inserted in and removed from the slide 73 automatically. The slide 73 may be pushed to and fro by the robot between the two positions according to FIG. 9*a* and FIG. 9*b*. In this way the mold may be easily integrated into an automatic process.

As explained above, the mold according to the invention may be used to produce a particle foam part which has a substantially wedge-shaped body. Wedge-shaped means that the body is thicker at one end than at the other end, with the thickness reducing gradually from the thick end to the thin end. Naturally, the surfaces of the wedge-shaped body may be contoured and need not be exactly flat. The special feature of such a wedge-shaped body of a particle foam part lies in the fact that this body has substantially over the whole area a roughly constant density of foam particles. Wedge-shaped particle foam parts produced with conventional molds generally have a lower density of foam particles in their thicker areas than in their thinner areas. This may however be disadvantageous, in particular if an elastic material such as e.g. eTPU is used for the foam particles, since then conventionally produced wedge-shaped bodies of foam particles are very soft in the thick area, while on the other hand being very firm in the thin area. By forming the wedge-shaped body with an even density of foam particles, a roughly even strength of the body over its whole volume is obtained.

The invention may be summarized briefly as follows:

The present invention relates to a crack gap mold with two mold halves for producing a particle foam part. The mold halves are arranged so as to be pivotable relative to one another in such a way that, on filling with foam particles, certain areas may be spaced differently apart and, during compression into the closed position, the mold halves may be moved a different distance together, on account of the swiveling movement. By this means, areas of the mold cavity may be evenly compacted with differing thickness, or differently compacted with the same thickness.

LIST OF REFERENCE NUMBERS 1 crack gap mold
2 die mold half
3 punch mold half
4 base
5 side wall
6 mold cavity
7 framework
8 framework
9 mold body
10 mold body
11 casing
12 core
13 clamping platen
14 swivel plate
15 swivel axis
16 clamping platen
17 swivel lever
18 swivel lever
19 threaded bolt
20 bolt head
21 spring element
22 edge area
23 edge area
24 central outer surface
25 base
26 tapped hole
27 spring pin
28 coil spring
29 spring pin head
30 spring pin bushing
31 collar
32 guide bore
33 spacer column
34 locking strip
35 cover
36 locking through hole
37 locking strip
38 through hole
39 through hole
40 narrow opening area
41 wide opening area
42 rivet
43 tongue
44 web
45 small plate
46 slot
47 through hole
48 guide pin
49 guide pin head
50 filler hole
51 filler hose
52 production apparatus
53 supply tank
54 press
55 press table
56 press punch
57 cylinder-piston unit
58 frame
59 waveguide
60 RF generator
61 baseplate
62 particle foam part
63 steam chamber
64 steam chamber
65 valve
66 valve
67 valve
68 valve
69 seal
70 elongated hole
72 recess
73 slide
74 filler hole
75 nozzle
76 blowing air port
77 slot
78 strip
79 channel
80 nozzle
81 vent hole
101 separate punches
102 actuating punch
103 actuating plate
104 piston rod
105 counter-plate
106 frame
107 spring elements
108 spring element
109 actuating piston
110 cylinder space

The invention claimed is:
1. Crack gap mold for the production of a particle foam part, the crack gap mold comprising two mold halves which, during filling the mold with foam particles, are arranged in a crack gap position, in which the mold halves are spaced somewhat apart from one another, as compared with a closed position, and which are designed for pressing together the foam particles therein before welding,
wherein the mold halves are arranged so as to be movable relative to one another in such a way that, on filling with foam particles, certain areas are spaced differently apart so that, during compression into the closed position, the mold halves at least in certain areas are moved a different distance together by mounting one of the two mold halves pivotably around a swivel axis so that, on the compression from the crack gap position into the closed position, this mold half executes a swiveling movement during the compression to produce the particle foam part.
2. The crack gap mold according to claim 1,
wherein the swivel axis is arranged so as to be eccentric.
3. The crack gap mold according to claim 1,
wherein the swivel element may be pivoted around the swivel axis by a predetermined swivel range, wherein a swivel range limiting element is provided to limit the swivel range and is adjustable.
4. The crack gap mold according to claim 1,
wherein each of the two mold halves is mounted on a clamping platen, wherein at least one part of one of the two mold halves is designed to be movable relative to the corresponding clamping platen.
5. The crack gap mold according to claim 4,
wherein between the clamping platens there are provided spring-loaded spacer elements, with which the clamping platens may be held at a distance by means of the spring effect of the spacer elements in such a way that the two mold halves are in the crack gap position.

6. The crack gap mold according to claim 4, wherein one of the two mold halves may be joined to the corresponding clamping platen by means of a swivel joint.

7. The crack gap mold according to claim 6, wherein the mold half which is movable relative to the corresponding clamping platen is either freely movable within a predetermined range of movement and is the upper mold half so that, on account of its weight, it assumes a maximum distance from the clamping platen in the crack gap position and/or a spring element which presses the mold half away from the clamping platen is provided between the movable mold half and the corresponding clamping platen.

8. The crack gap mold according to claim 4, wherein there are provided on at least one of the two clamping platens one or more guide pins, each able to engage in a guide bore formed in the other clamping platen, wherein a loss prevention device is provided to prevent complete separation between the guide pin and the corresponding guide bore.

9. The crack gap mold according to claim 1, wherein one of the two mold halves has a section with a through hole which, in the crack gap position, bounds a hollow space formed between the two mold halves, and in the closed position of the crack gap mold, fits against the outside of the other mold half so that the through hole thus forms in the crack gap position a free passage into the hollow space, and in the closed position is closed.

10. The crack gap mold according to claim 9, wherein a plug is provided for closing the through hole and has substantially the same dielectric constant as the material bordering the through hole.

11. The crack gap mold according to claim 9, wherein the through hole is designed for the supply of foam particles and/or for the escape of air.

12. A particle foam part produced using a crack gap mold according to claim 1, the crack gap mold comprising two mold halves which, for filling the mold with foam particles, may be arranged in a crack gap position, in which the mold halves are spaced somewhat apart from one another, as compared with a closed position, and which are designed for pressing together the foam particles therein before welding, wherein the mold halves are arranged so as to be movable relative to one another in such a way that, on filling with foam particles, certain areas may be spaced differently apart so that, during compression into the closed position, the mold halves may in certain areas be moved a different distance together.

13. The crack gap mold according to claim 1, wherein the particle foam part has a roughly wedge-shaped form.

14. A method for producing a particle foam part, the method comprising:

providing a crack gap mold comprising two mold halves;

filling the mold with foam particles while arranging the two mold halves in a crack gap position, in which the mold halves are spaced somewhat apart from one another, as compared with a closed position, and which are designed for pressing together the foam particles therein before welding;

positioning the mold halves relative to one another in such a way that, on filling with foam particles, certain areas are spaced differently apart; and compressing the two mold halves into the closed position, while moving the mold halves at least in certain areas a different distance together by mounting one of the two mold halves pivotably around a swivel axis so that, on the compression from the crack gap position into the closed position, this mold half executes a swiveling movement during the compression to produce the particle foam part, which is roughly wedge-shaped.

* * * * *